Patented Jan. 1, 1929.

1,697,530

UNITED STATES PATENT OFFICE.

ARTHUR LANGMEIER, OF DOVER, NEW JERSEY, ASSIGNOR TO HERCULES POWDER COMPANY, OF WILMINGTON, DELAWARE, A CORPORATION OF DELAWARE.

METHOD OF PRODUCING GLYCOL ESTERS OF ABIETIC ACID.

No Drawing.  Application filed April 12, 1928. Serial No. 269,608.

My invention relates to a method for producing glycol esters of abietic acid, for example, as found in rosin. In the carrying out of the method in accordance with my invention, I subject abietic acid, or rosin, such as wood rosin or gum rosin, to esterification with, for example, olefin dihalides, such as ethylene dichloride, amylene dichloride, ethylene dibromide, or the like.

In the carrying out of my method the abietic acid, or rosin, is preferably subjected to esterification with ethylene dichloride, ethylene dibromide, or the like in the form of an abietate or resinate in alcoholic solution. The abietate or resinate may be formed by dissolving abietic acid, or rosin, in for example, a solution of alkali, as for example, sodium hydroxide, potassium hydroxide, or the like, in alcohol. The treatment is preferably carried out under pressure where ethylene dichloride is used, while where ethylene dibromide is used, the treatment may be carried out under atmospheric pressure. In carrying out the treatment the alcoholic solution of abietate or resinate may be heated to bring about the desired reaction with the ethylene dichloride, ethylene dibromide, or the like.

As a more specific example of the production of glycol esters of abietic acid, according to the method embodying my invention using, for example, ethylene dichloride, say about 450 parts of N grade rosin are dissolved in about 650 parts of an alcoholic solution containing about 60 parts of sodium hydroxide. To the solution formed is added about 100 parts ethylene dichloride and the mixture heated to a temperature of about 135–140° C., in an autoclave, under pressure of about 90 pounds for a period of two hours. After the heating period, the alcohol is distilled off and the residue is heated to a temperature of about 300° C. under a pressure of about one-half inch mercury in order to remove the free rosin. On removal of free rosin, the residue will be found to consist of glycol ester of abietic acid having an acid number of about 34.

As a further illustration of the carrying out of the method in accordance with my invention, in the production, for example, of esters of a higher grade, the ingredients in the proportions given above are heated to a temperature of about 140–145° C. for a period of four hours, under a pressure of about 100–110 pounds. After distillation off of the alcohol and heating to about 300° C. under pressure of one-half inch of mercury in order to remove rosin, a yield of ester amounting to about 405 parts and having an acid number of 4, a melting point of 72° C. (drop method) and grading D in color, will be obtained. The ester so obtained will be found to be substantially as hard as rosin.

In the carrying out of the method in accordance with my invention, instead of using ethylene dichloride a higher olefin dichloride may be used, as for example, amylene dichloride. As an example of the production of an ester in accordance with my method using amylene dichloride, say 60 parts of sodium hydroxide, 450 parts of rosin, 600 parts of alcohol and 250 parts of amylene dichloride are heated to a temperature of about 150–155° C. for a period of about eight hours under pressure of about 160 pounds per square inch. About 240 g. of ester, A. N. 30 will be obtained.

In the carrying out of the method in accordance with my invention, it will be understood that ethylene dibromide, propylene dichloride, amylene dichloride and the like, or mixed olefin dichloride, may be used in place of ethylene dichloride, and that the temperatures and pressures under which the reaction is carried out may be varied within substantial limits, particular temperature and pressure being dictated by the grade of ester desired to be produced, and by the choice of an esterifying agent, the reaction being practicable at or approximately atmospheric pressure when ethylene dibromide is used. For example, the production of the ester may be effected in accordance with my invention at temperatures within the range of about 75° C. to 200° C. and the pressure may vary from atmospheric to about 325 pounds per square inch. The period required for esterification to the desired extent will depend upon the temperature and pressure used. The reaction may be carried out with the use of aqueous alkali solution, instead of alcoholic solutions, with longer period of heating and preferably under pressure, though with aqueous alkali it will be more difficult to obtain a product of low acidity.

Having now fully described my invention, what I claim and desire to protect by Letters Patent is:

1. The method of producing a glycol ester of abietic acid which includes heating abietic acid with an alkali and an olefin dihalide.

2. The method of producing a glycol ester of abietic acid which includes heating rosin with an alkali and an olefin dihalide.

3. The method of producing a glycol ester of abietic acid which includes heating abietic acid with ethylene dichloride and an alkali under pressure.

4. The method of producing a glycol ester of abietic acid which includes heating rosin with ethylene dichloride and an alkali under pressure.

5. The method of producing a glycol ester of abietic acid which includes forming a solution of abietic acid and an alkali in alcohol and heating with an olefin dihalide.

6. The method of producing a glycol ester of abietic acid which includes forming a solution of abietic acid and an alkali in alcohol and heating with ethylene dichloride.

7. The method of producing a glycol ester of abietic acid which includes forming a solution of rosin and sodium hydroxide in alcohol and heating with ethylene dichloride under pressure.

8. The method of producing a glycol ester of abietic acid which includes heating an alcoholic solution of abietic acid and an alkali and an olefin dihalide to a temperature of about 140° C., and raising the temperature to about 300° C. when the esterification has proceeded to the desired extent, to effect the removal of alcohol and free rosin from the ester.

9. The method of producing a glycol ester of abietic acid which includes heating sodium resinate and an olefin dichloride.

10. The method of producing a glycol ester of rosin which includes heating sodium resinate with ethylene dichloride.

11. The method of producing a glycol ester of abietic acid which includes heating sodium resinate, alcohol, and an olefin dichloride under pressure.

12. The method of producing a glycol ester of abietic acid which includes heating sodium resinate, alcohol and ethylene dichloride under pressure.

13. The method of preparing a glycol ester of rosin which includes heating sodium resinate and an olefin dihalide.

14. The method of preparing a glycol ester of rosin which includes heating an alcohol solution of sodium resinate and an olefin dihalide under pressure.

In testimony of which invention, I have hereunto set my hand, at Wilmington, Del., on this 31st day of March, 1928.

ARTHUR LANGMEIER.